United States Patent [19]

Noujaim

[11] Patent Number: 4,766,416
[45] Date of Patent: Aug. 23, 1988

[54] CIRCUIT FOR GENERATING THE SQUARE OF A FUNCTION WITHOUT MULTIPLIERS

[75] Inventor: Sharbel E. Noujaim, Clifton Park, N.Y.

[73] Assignee: General Electric Company, Schenectady, N.Y.

[21] Appl. No.: 74,374

[22] Filed: Jul. 16, 1987

[51] Int. Cl.⁴ .............................................. H03M 1/00
[52] U.S. Cl. ............................. 340/347 AD; 364/736; 364/753; 364/754
[58] Field of Search ................. 340/347 AD, 347 DD; 364/736, 753, 754, 757, 759, 760, 768

[56] References Cited

U.S. PATENT DOCUMENTS 4,071,842  1/1978  Tewksbury .................. 340/347 AD

OTHER PUBLICATIONS

Tretter, Steven A., "Introduction to Discrete-Time Signal Processing", John Wiley & Sons, Inc., 1976, pp. 77-81.

Derusso, Paul M. et al., "State Variables for Engineers", John Wiley & Sons, Inc., 1965, pp. 407-410.

Primary Examiner—William M. Shoop, Jr.
Assistant Examiner—Richard K. Blum
Attorney, Agent, or Firm—Lawrence D. Cutter; James C. Davis, Jr.; Marvin Snyder

[57] ABSTRACT

A pair of feedback accumulators are employed in conjunction with an oversampled analog to digital converter to generate the squared binary representation of the analog input signal. Advantage is taken of the particular form of the output waveform from oversampled analog to digital converter circuits to generate not only a standard digital output, but also the squared output after a plurality of bit-time periods L. The circuit avoids the utilization of digital multiplier circuits to perform the squaring function. The circuit is particularly applicable in the construction of electronic circuit breakers which must compute a binary representation of the square of an analog input current level signal, $I^2$.

6 Claims, 4 Drawing Sheets

CIRCUIT FOR GENERATING THE SQUARE OF A FUNCTION WITHOUT MULTIPLIERS

BACKGROUND OF THE INVENTION

The present invention is generally related to the generation of a binary digital signal representing the square of an analog input signal. More particularly, the present invention takes advantage of the strictly binary nature of the output from an oversampled analog to digital converter to readily implement, in digital circuit form, a recursively specified digital circuit equation which generates the desired digital representation of the square of an analog input function.

In the construction of certain circuit breakers, a root mean square digital signal is required to be generated. In particular, it is desired to generate a representation for an $I^2$ signal, where I represents current level. To design an RMS (root mean square) electronic circuit breaker, it is necessary to generate the value of $I^2$ in digital form. This could be done by multiplying the digitized value of I by itself. Unfortunately, digital multipliers are expensive in terms of integrated circuit chip area. Furthermore, for a multi-channel circuit breaker, the problem is compounded. One could solve the multi-channel problem by sharing a multiplier resource with the different channels. However, this in itself requires complicated control circuitry. Accordingly, it is desirable to be able to implement the squaring function digitally without the use of a multiplier and control circuitry to time share the multiplier resource.

While the present invention has arisen out of the desire to compute the $I^2$ function for use in electronic circuit breakers, it is, however, seen that the present invention is not limited thereto, but is applicable to any situation in which the squared function is desired and in which an oversampled analog to digital signal is present.

For a proper understanding of the present invention, it is necessary to appreciate the operation of oversampled analog to digital converter circuits. These circuits operate in a fashion to produce a string of binary signals representing zero and one values and whose summation is indicative of the (average) level of an analog input signal (usually over a short time period). Oversampled analog to digital conversion circuits typically operate at sampling frequencies which are much greater than the Nyquist frequency associated with the input signal which is being converted. The ratio of this sampling frequency to the Nyquist frequency is typically between about 10 and 1,000. This ratio assures that significant changes in the analog input signal do not occur over a large plurality of sampling times thus rendering "averages" more representative of instantaneous signals. Such conversion circuits are particularly useful and desirable in power line circuits or in any other circuits which exhibit high noise levels, particularly when noise is present in the form of spikes. Oversampled analog to digital conversion is typically carried out through the use of circuits known as delta-sigma converters. In many applications of these converters, the output circuit typically comprises a digital filter which often simply is a counter which accumulates a tally of the number of one-bits that exist in the output signal over a period of time. Periodically the counter is reset to zero and the generation of the next binary output signal is begun. The present invention takes advantage of the nature of the output signal from such oversampled analog to digital converters to not only generate the usual output signal y, but also the signal $y^2$.

SUMMARY OF THE INVENTION

In accordance with a preferred embodiment of the present invention, an oversampled analog to digital conversion means is employed. The oversampled analog to digital conversion means produces a time sequence of single bit output signals whose binary sum, over a period of at least L bit time periods, represents, in binary form, the level of the analog input signal. A first, N-bit, clocked, feedback accumulator receives the output signal from the analog to digital conversion means and operates to add to the accumulation the previous contents of this first accumulator. Moreover, the present invention employs a second, clocked, feedback accumulator having 2N bits which receives the N-bit binary output signal from the first accumulator. The output from the first accumulator is coupled into the input of the second accumulator in such a way as to effect a multiplication by two, this readily being accomplished by a shift in bit position. Moreover, the second accumulator also receives the single bit output signal from the oversampled analog to digital conversion means in its least significant bit position. The second accumulator is also configured to add to its input its previous binary output signal at each clock cycle. Also provided for operation of the present invention, are means for inhibiting the receipt of the N-bit binary signal from the first accumulator by the second accumulator, this inhibition being based upon the single bit output signal from the oversampled conversion means.

In accordance with another embodiment of the present invention, a digital circuit is configured to implement either one of two digital difference equations based upon the output from an oversampled analog to digital converter. In particular, when this output is a binary 1, the difference equation $y(n)^2 = y(n-1)^2 + 2y(n-1) + 1$ is implemented and when the output of the converter circuit is 0, the difference equation $y(n)^2 = y(n-1)^2$ is implemented.

Accordingly, it is an object of the present invention to generate a binary square function from an analog signal with a minimum amount of hardware.

It is also an object of the present invention to implement the square function without the use of multiplier circuits.

It is yet another object of the present invention to improve the design of electronic circuit breaker devices.

It is still another object of the present invention to generate a binary signal which is representative of the squared value of an analog current signal, particularly for use in electronic circuit breaker devices.

It is yet another object of the present invention to improve the design of multi-channel circuit breakers.

It is still another of the present invention to provide a digital circuit which produces not only the standard digitized output from an oversampled analog to digital converter means, but also the square of this output.

Lastly, but not limited hereto, it is an object of the present invention to generate, in digital form, the square of an analog signal using accumulator circuit devices.

DESCRIPTION OF THE FIGURES

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1:
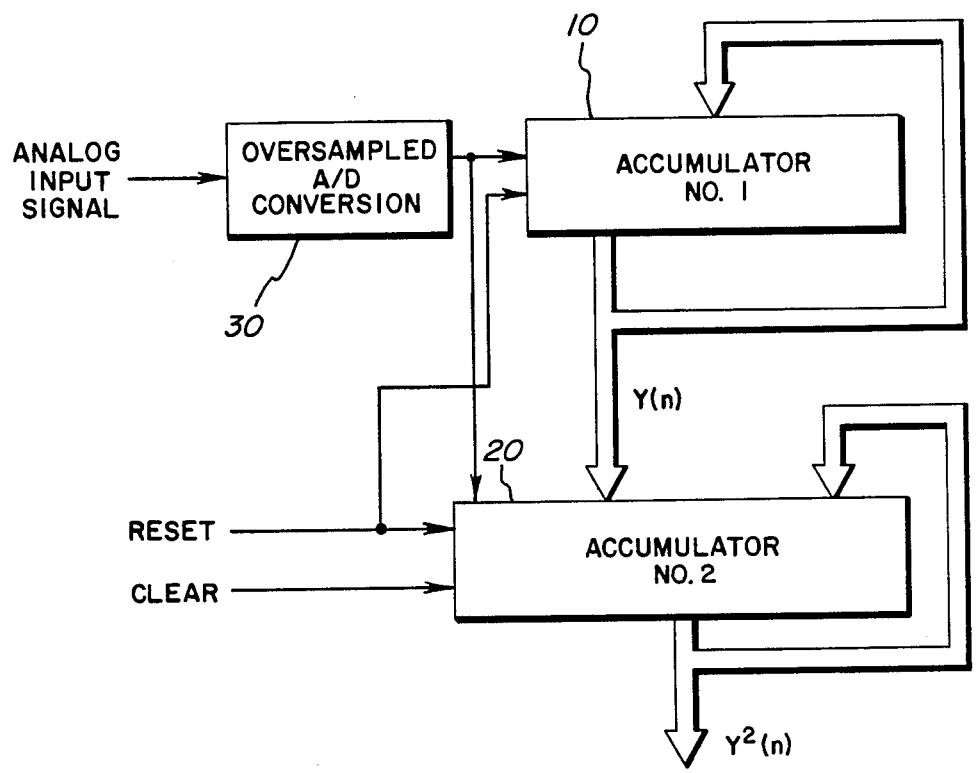
FIG. 1 a block diagram illustrating the overall structure of the present invention.

A block diagram of the present invention is illustrated in FIG. 1. In particular, the operation of the present invention is highly dependent upon the nature of the output signal from oversampled analog to digital conversion means 30. This circuit receives an analog input signal and supplies an output signal to accumulator 10 (designated as No. 1) in FIG. 1. The output of converter circuit 30 comprises a time sequence of single bit output signals whose binary sum, over a period of at least L-bit time periods, represents in binary form, the (average) level of the analog input signal. The output of conversion means 30 is accumulated in accumulator 10 to generate a digital word at any time n in accordance with the following equation:

$$y(n) = y(n-1) + \Delta(n), \tag{1}$$

where $\Delta(n)$ is the single bit output of the oversampled analog to digital converter 30 at bit-time n. The value of $\Delta(n)$ can only be 0 or 1. Advantage is taken of this fact in this invention to produce the desired output results.

The value of n is between 0 and N where N is the so-called "decimation ratio" between the high frequency output of the oversampled analog to digital conversion means and the Nyquist sampling frequency of the input signal. The output of accumulator 10 is reset every N bit-line clock cycles and the sequence is repeated. In other words, y (0) is equal to 0 every N cycles and y(N) is equal to the digitized value of the input signal at the Nyquist sampling rate.

The output y(n) of accumulator 10 at every instant of time n between 0 and N is provided to accumulator 20 (designated as No. 2 in FIG. 1). Accumulator 20 performs the following function:

$$y(n)^2 = y(n-1)^2 + 2*\Delta(n)*y(n-1) + (\Delta(n))^2, \tag{2}$$

where "*" denote multiplication. Because the value of $\Delta(n)$ is only 0 or 1, it can be easily seen that equation (2) becomes either $$y(n)^2 = y(n-1)^2 = 2*y(n-1)+1 \text{ if } \Delta(n)=1 \tag{3}$$

or $$y(n)^2 = y(n-1)^2 \text{ if } \Delta(n)=0 \tag{4}$$

In other words, the square of y(n) at any time n between 0 and N is equal to the previous squared value if $\Delta(n)=0$ or is equal to the previous squared valued plus twice the previous value plus 1 if $\Delta(n)=1$. Accumulator 20 like accumulator 10, is reset every N bit-time clock cycles. In both accumulator 10 and accumulator 20, the feedback path and register delay is employed to implement the addition of y(n-1) and y(n-1)², respectively.

Figure 2:
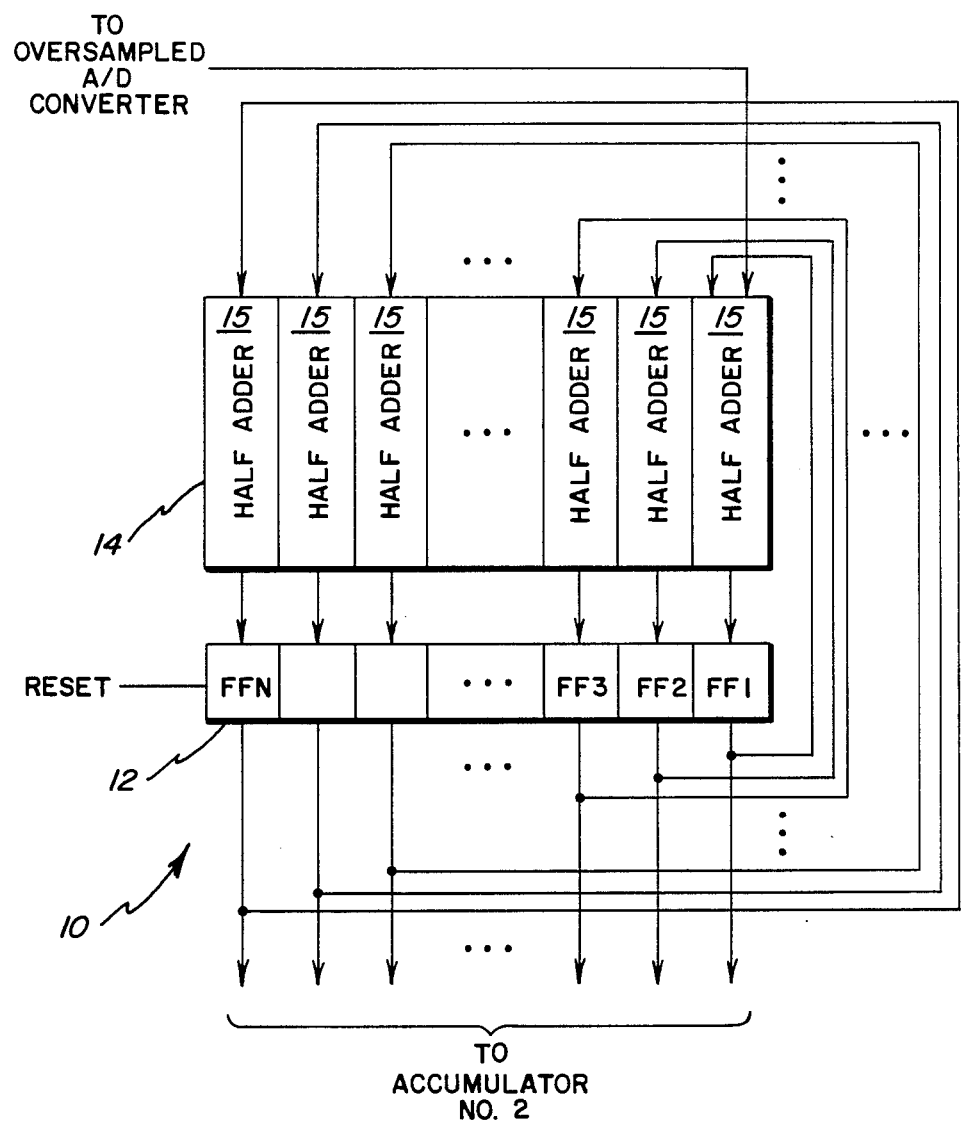
FIG. 2 is a schematic block diagram illustrating the structure of the first accumulator (No. 1 in FIG. 1)

A more detailed view of accumulator 10 is seen in FIG. 2. In particular, it is seen that accumulator 10 essentially comprises N half adder circuits 15. The output from bank 14 of half adders 15 is supplied to a set of N flipflops 12 which are reset every N bit-time clock cycles. It is noted that the output of flipflops FF1 through FFN are supplied not only to the inputs of the respective half adders, but are also supplied to accumulator 20. Accumulator 10 shown in FIG. 2, essentially produces the output y(n). It is further seen that the least significant output bit position in accumulator 10 is supplied with the single bit signals $\Delta(n)$ from oversampled A/D converter 30, to accumulator 20.

Figure 3:
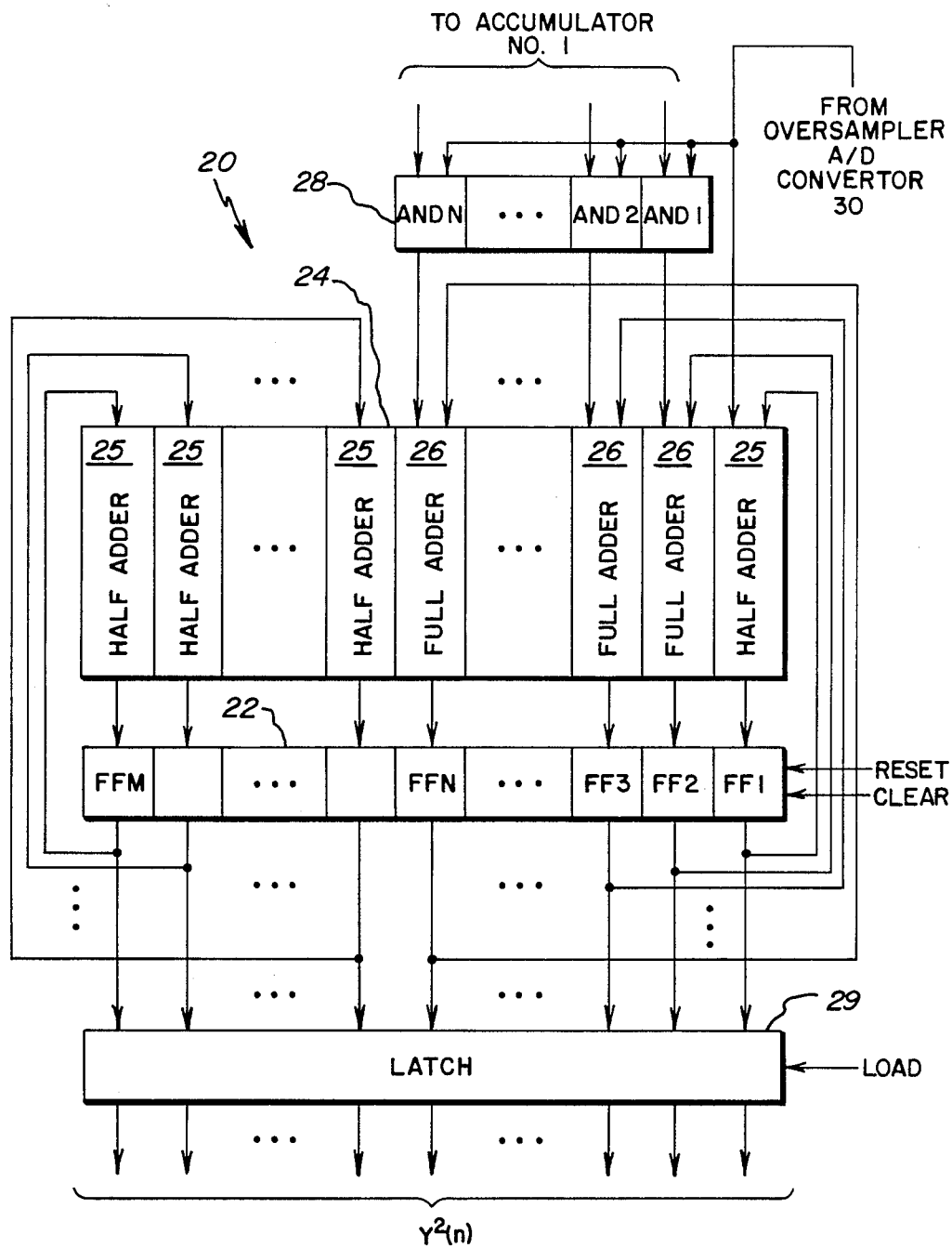
FIG. 3 is a schematic diagram illustrating the structure and signal flowpaths for the second accumulator (No. 2 in FIG. 1)

The most important features of the present invention are, however, illustrated in FIG. 3. The output of accumulator 10 is supplied to accumulator 20. However, there are two items to be noted with respect to the output from accumulator 10. First, the output is shifted one bit position to the left in FIG. 3. This effectively multiplies the output y(n-1) from accumulator 10 by a factor of two. Thus, the output from accumulator 10 does not feed directly into the least significant bit position in accumulator 20, but rather to the next highest bit position as shown. Furthermore, it is also noted that the output from accumulator 10 may be inhibited by block 28 of AND gates AND1, AND2, ... and ANDN. This AND gate block is controlled by signal $\Delta(n)$ from converter 30. This essentially ensures that $y(n)^2 = y(n-1)^2$ whenever $\Delta(n)=0$. It is also noted that the signal $\Delta(n)$ is also supplied to half adder 25 in the least significant bit position of accumulator 20. This essentially implements the addition of the "1" seen in the rightmost portion of equation (3) above. As above, for accumulator 10, accumulator 20 is also provided with a plurality of time delayed feedback paths from flipflops FF1 through FFM to provide the desired addition of y(n-1)², whether or not $\Delta(n)$ is 0 or 1. In FIG. 3, M, designating the leftmost flipflop, is typically 2N.

From FIG. 3 it is seen that accumulator 20 typically comprises a single half adder 25 for the least significant bit, N/2 full adders and (N-2)/2 half adders for the most significant bits. Accumulator 20 is also seen to include resettable shift register 22. The output of the shift register is fed back to the input of the accumulator, as shown.

Figure 4:
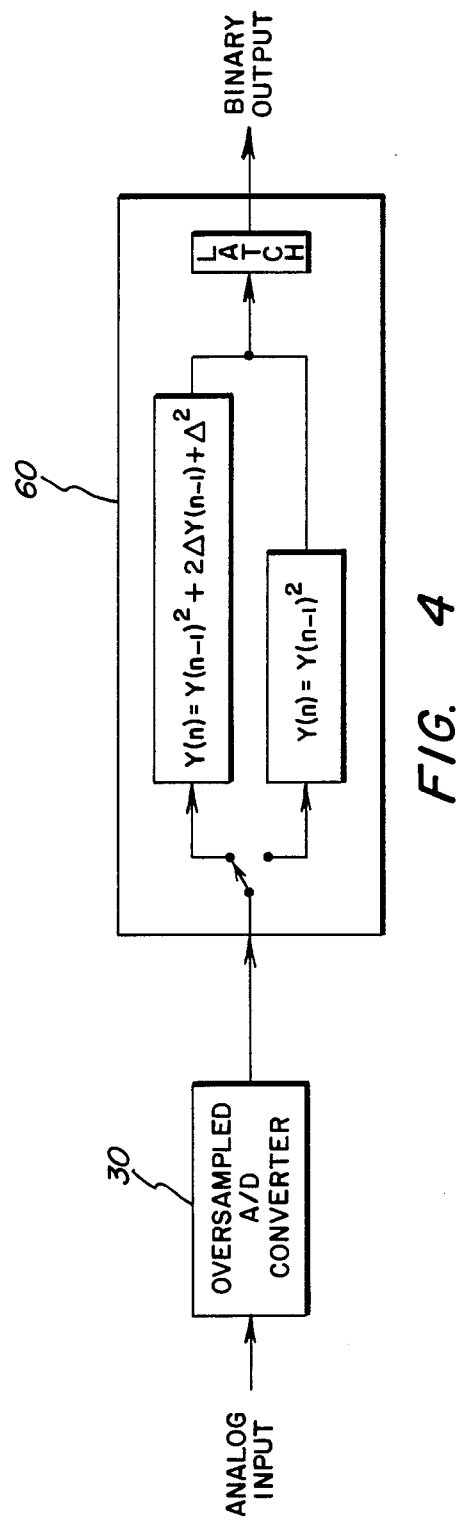
FIG. 4 is a block diagram illustrating an alternate conceptualization and embodiment of the present invention.

The output of accumulator 20 represents the value of y(N)² at the end of every N bit-time clock cycles. Equations (3) and (4) are implemented in accumulator 20 by shifting the output of accumulator 10 one bit left and ANDing it with the value of $\Delta(n)$ before accumulating it in accumulator 20. The present invention may also be considered as a pair of digital circuits operating to implement either one or the other of two difference equations depending upon the single bit output $\Delta(n)$ from converter means 30. This embodiment is illustrated more particularly in FIG. 4. When the output $\Delta(n)$ of converter 30 is "1", then equation (3) above is implemented. On the other hand, when the signal $\Delta(n)$ is 0, the equation implemented is equation (4) above.

It is noted that the system employed herein is also extendable to cover situations in which one wishes to generate functions such as y(n)³. This is accomplished by noting that the cubed expansion of $y(n-1) = y(n-1) + \Delta(n)$ produces $$y(n)^3 = y(n-1)^3 + 3\Delta(n)y(n-1)^2 + 3\Delta(n)^2 y(n-1) + \Delta(n)^3 \quad (5)$$

As above, $\Delta(n)$ is either 0 or 1 so that:

$$y(n)^3 = y(n-1)^3 + 3(y(n-1)^2 + y(n-1)) + 1 \text{ if } \Delta(n) = 1 \quad (6)$$

or $$y(n) = y(n-1)^3 \text{ if } \Delta(n) = 0 \quad (7)$$

In the present invention, a circuit for implementing the cube function employs three clocked feedback accumulators. The first and second accumulators generate $y(n-1)$ and $y(n-1)^2$ as above. The last such accumulator has 3N bits. For this third accumulator $\Delta(n)$ is supplied to its low order bit position. As additional, non-feedback adder is preferably employed to form the sum $y(n-1)^2 + y(n-1)$. This sum is supplied to the two low order bit positions of the third accumulator, thus effectively multiplying this sum by 3, as indicated above in equation (6). Further extensions of this idea to the generation of $y(n)^4$, $y(n)^5$ and linear combinations of these functions are also possible using the methods provided above.

From the above, it should be appreciated that the circuit of the present invention is readily able to generate the value of the square of an analog input function at time N. It is also seen that the present invention is particularly operable in conjunction with oversampled analog to digital conversion devices in a fashion to reduce the need for providing complicated multiplier circuitry, particularly for multi-channel circuit breaker device applications. It is also seen that the present invention also operates to produce the output signal $y(n)$ in addition to the squared function. It is thus seen that the present invention desirably co-acts and cooperates with the operation of oversampled analog to digital conversion devices to produce desirable digital signals which are particularly applicable for use in electronic circuit breaker devices.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. An analog to digital conversion circuit for producing a digital signal representative of the square of the input signal, said circuit comprising:

oversampled analog to digital conversion means for producing a time sequence of a single bit output signal whose binary sum over a period of at least L bit-time periods represents, in binary form, the level of an analog input signal;

a first, N-bit, clocked, feedback accumulator receiving said single bit output signal from said oversampled analog to digital conversion means and adding to said single bit signal the previous contents of said first accumulator every clock cycle;

a second, clocked, feedback accumulator having 2N bits for receiving said N bit binary output signal from said first accumulator, said first accumulator output signal being supplied to N contiguous bit positions of said second accumulator beginning with the next highest bit position after the least significant bit position in said second accumulator, said second accumulator also receiving said single bit output signal in the least significant bit position of said second accumulator, said second accumulator also being configured to add to its input its previous binary output signal every bit-time clock cycle; and means for inhibiting the receipt of said N-bit binary output signal from said first accumulator, said inhibition being based upon said single bit output signal.

2. The circuit of claim 1 further including means to reset said accumulator to zero after each L bit-time periods.

3. The circuit of claim 1 in which said inhibiting means comprises a set of AND gates controlled by said single bit line signal.

4. A digital circuit for operating in conjunction with an oversampled analog to digital converter for producing a digital signal representative of the square of the input signal, said circuit comprising:

a first, N-bit, clocked, feedback accumulator receiving a single bit output signal from an oversampled analog to digital converter and adding to said single bit signal the previous contents of said first accumulator every clock cycle;

a second, clocked, feedback accumulator having 2N bits for receiving said N-bit binary output signal from said first accumulator, said first accumulator output signal being supplied to N contiguous bit positions of said second accumulator beginning with the next highest bit position after the least significant bit position of said second accumulator, said second accumulator also receiving said single bit output signal in the least significant bit position of said second accumulator, said second accumulator also being configured to add to its input its previous binary output signal every bit-time clock cycle; and means for inhibiting the receipt of said N-bit binary output signal from said first accumulator, said inhibition being based upon the single bit output signal of said oversampled analog to digital converter.

5. A system for generating the binary representation of the square of an analog input signal, said system comprising:

an oversampled analog to digital converter for producing a time sequence of single bit signals whose binary sum over a period of at least L bit-time periods represents, in binary form, the level of an analog input signal supplied to said analog to digital converter; and a digital circuit whose input/output relationship is specified by the difference equation $y(n)^2 = y(n-1)^2 + 2\Delta(n)y(n-1) - \Delta(n)$ where $\Delta(n)$ is the input to said digital circuit and is also the single bit binary value of the output of said oversampled analog to digital converter at time n.

6. The system of claim 5 in which said digital circuit includes separate digital circuits one of which exhibits an input/output relationship specified by the difference equation $y(n)^2 = y(n-1)^2 + 2y(n-1) + 1$ and the other of said separate digital circuits exhibits an input/output relation governed by the difference equation $y(n)^2 = y(n-1)^2$, the one or the other of said separate digital circuits being operative depending upon whether $\Delta(n) = 1$ or $\Delta(n) = 0$, respectively.

* * * * *